March 31, 1953   G. PIELSTICK   2,633,218
FLUID CLUTCH WITH REMOVABLE MEMBERS
Filed May 5, 1949   2 SHEETS—SHEET 1

INVENTOR.
GUSTAV PIELSTICK
BY Mock & Blum
ATTORNEYS

March 31, 1953 G. PIELSTICK 2,633,218
FLUID CLUTCH WITH REMOVABLE MEMBERS
Filed May 5, 1949 2 SHEETS—SHEET 2
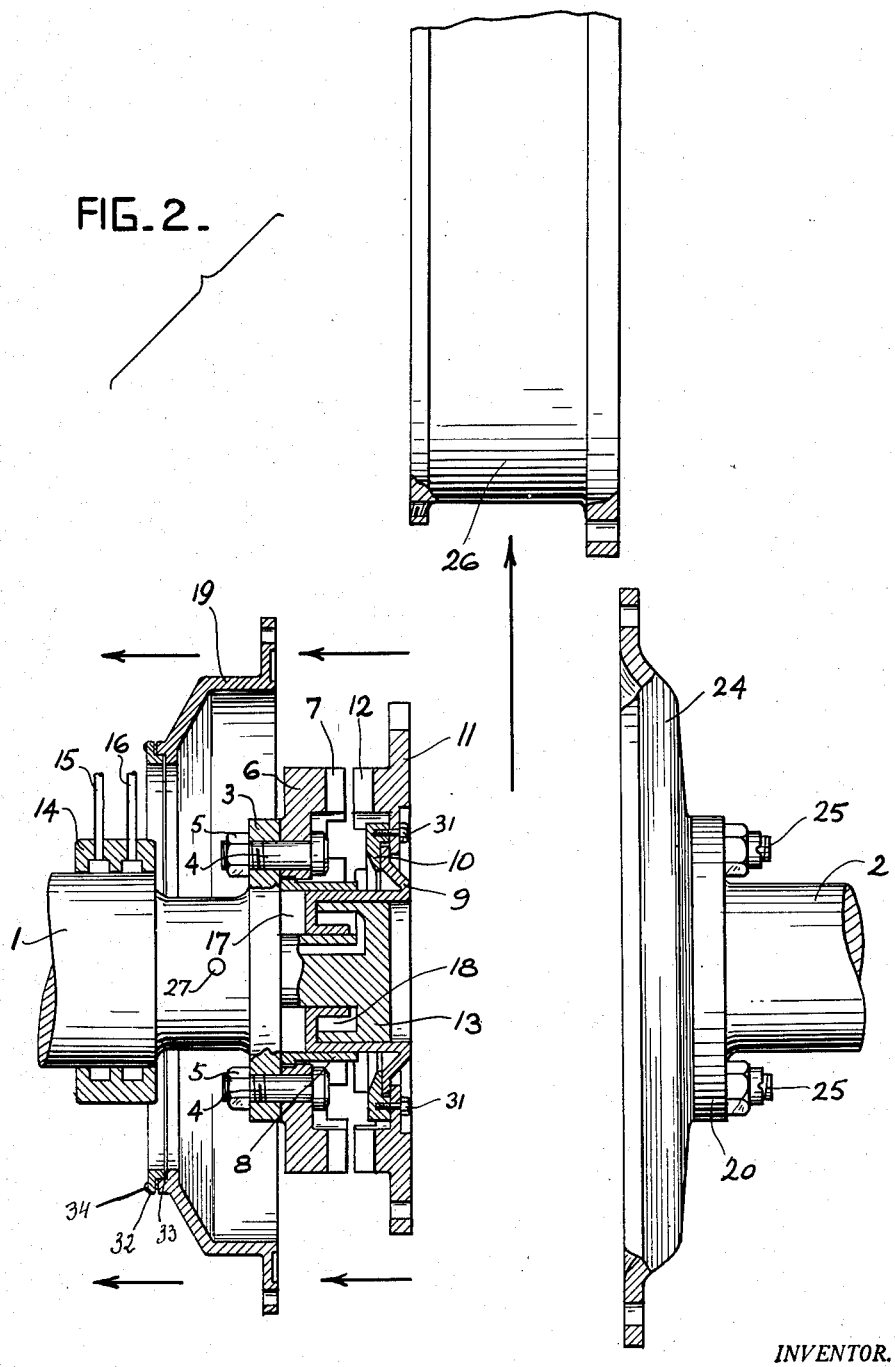
INVENTOR.
GUSTAV PIELSTICK
BY Mock & Blum
ATTORNEYS Patented Mar. 31, 1953

2,633,218

UNITED STATES PATENT OFFICE 2,633,218

FLUID CLUTCH WITH REMOVABLE MEMBERS

Gustav Pielstick, Saint-Germain-en-Laye, France

Application May 5, 1949, Serial No. 91,563
In France May 27, 1948

2 Claims. (Cl. 192—86)

This invention relates to control devices for clutch-couplings. In recent years, clutch couplings have been constructed in which the operating means for engaging and disengaging the coupling comprises an externally-arranged cylinder, an actuating lever and a clutch collar. Such prior arrangements however were subject to various shortcomings. In addition to being space-consuming and containing a comparatively large number of constituent members, the arrangement renders the coupling less easy of access, and, because of the provision of the collar located externally of the coupling, it becomes more difficult to collect satisfactorily the oil which splashes out of the coupling. Moreover, dismantling is made more difficult because of the necessity of first removing the clutch lever and linkage. Then again, in mounting and dismantling such known arrangements, it is necessary frequently to move the drive and the driven shafts relatively to each other.

It is a general object of this invention to provide an operating assembly for a clutch coupling of the type described which is devoid of the above drawbacks.

The clutch operating device of the invention is located in a casing adapted to be readily dismounted from outside, said casing containing all of the essential elements of the clutch-operating mechanism, and rendering said elements perfectly accessible and adapted to be withdrawn and put back into place without requiring any relative displacement between the proper drive shaft and the driven shaft interconnected by said coupling.

According to another object or feature of the invention, there is provided a movable operating piston in a cylinder at the centre of the coupling, and adapted to displace the movable part of said coupling.

According to another object or feature, the above-mentioned cylinder is located inwardly of the plane of the intermeshing clutch teeth, or within the circumference defined by the latter.

The device is operated by means of fluid under pressure admitted into the cylinder alternately on the faces of the piston therein that are directed towards each of the two elements that are to be coupled with or uncoupled from each other.

It will be readily apparent that the arrangement contemplated by the invention makes it possible to secure very considerable advantages. In the first place, the space requirements of the device are reduced to a minimum and all such awkward operating elements as levers, clutch-collars, and the like are done away with. Then, owing to the relative arrangement of the cylinder and the clutch teeth, it is possible to remove the essential parts of the coupling assembly without having to shift the shafts themselves interconnected thereby.

As a result of the use of oil or similar fluid under pressure axial reactions on the intercoupled shafts are averted, and it becomes possible to obtain a safety-locking condition of the clutch in either one of its two end-positions.

Furthermore, the elimination of the clutch-operating collar makes it possible to provide a tightly sealed casing thus preventing leakage and splashing of lubricating oil.

Other objects and advantages of the invention will be apparent in the course of the following specification when taken in connection with the accompanying drawings which illustrate one preferred embodiment of a device made according to the invention, by way of indication only.

Fig. 2 is an exploded view of the device, partially in axial section, showing the method of disassembly.

Figure 1:
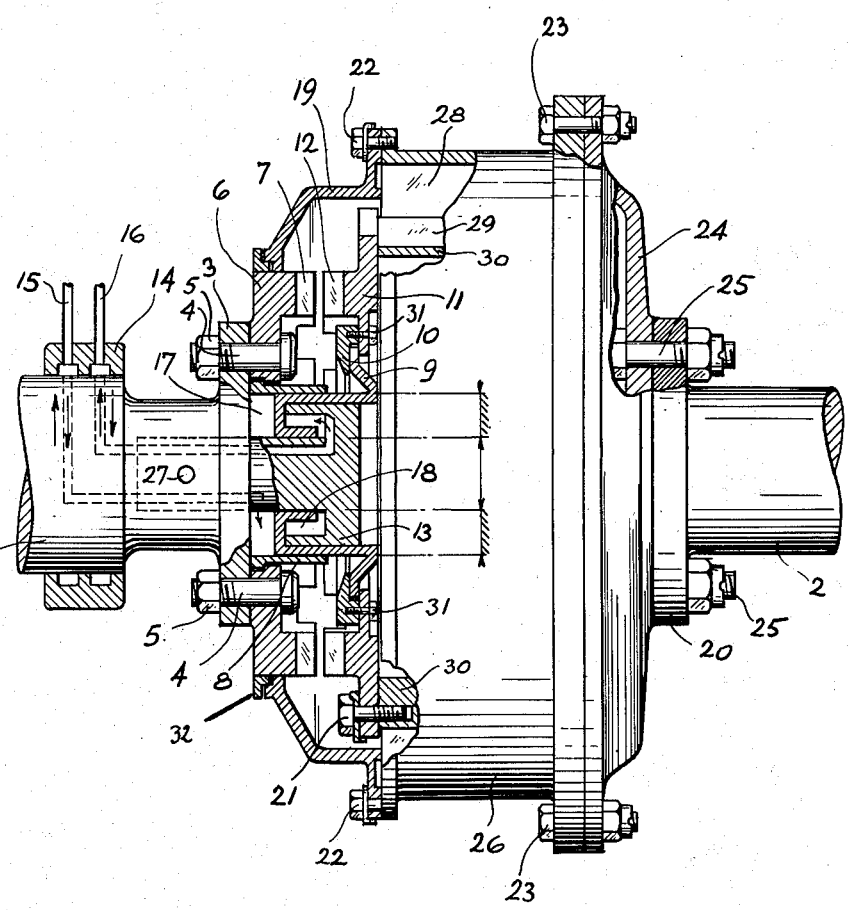
Fig. 1 is a side elevational view of the device in assembled form, shown partly in axial section and partly diagrammatically.

In the exemplary embodiment shown, the clutch is interposed between two shafts 1 and 2 which it enables to couple and uncouple selectively. The shaft 1 comprises a flange 3 having secured to it through bolts 4 and nuts 5 a clutch element in the form of an annulus 6 provided with a circumferential set of clutch teeth 7 on its outer side.

Within the circumference defined by the clutch-teeth 7 is a cylinder 8 rigidly secured to the end of the shaft 1. The cylinder 8 contains a hollow piston 9 slidable therein, said piston 9 having an inner diameter equal to the inner diameter of cylinder 8. The shaft 2 has an end flange 20 which is secured to an end plate 24 of a cylinder 26 by nut and bolt assemblies 25. The end plate 24 is connected to cylinder 26 by nut and bolt assemblies 23. Said cylinder 26 has a row of splines or teeth 28 on its inner peripheral surface which mesh with corresponding splines or teeth 29 of a drum 30 contained within said cylinder 26. The drum 30 is secured to a toothed annulus 11 by screws 21. The drum 30 and annulus 11 rotate with the shaft 2 and its cylinder 26, but are also axially slidable relative thereto due to the action of the splines or teeth 28 and 29.

The annulus 11 is, as shown, provided with clutch-teeth 12 cooperating with the clutch teeth 7. Said annulus 11 is connected by screws 31 to an annular disc 10. The piston 9 has an end flange which is located between said annular disc 10 and annulus 11, so that said piston is moved axially with the annulus 11.

An annular member 13 rigidly connected to the shaft 1, as by means of a locking screw or pin 27, defines the end-wall of the cylinder 8 and restricts the axial displacement of the piston 9. Said piston 9 has an outer diameter equal to the outer diameter of member 13 and is adapted to slide thereon.

An annular element 14 secured on the shaft 1 is formed with ducts 15 and 16 respectively connecting with the spaces 17 and 18 defined on the respective sides of the piston 9 and adapted to put those spaces in communication alternately with the source of pressure fluid (not shown) and with the atmosphere.

The entire clutch assembly is contained within a sealed casing 19, which is connected to cylinder 26 by screws 22.

As shown in the drawings, casing 19 has its side outer end of reduced diameter and formed with an opening of large diameter. As shown in Fig. 1 this area is in overlapping relation to the periphery of annulus 6. The wall area of casing 19 in this area is thin as compared with the thickness of the annulus and to increase the area of contact between the casing and annulus, an annular ring 32 is added to the area of casing 19 with sealing means 33 between the ring and the casing, the parts being secured together by suitable means, such as bolts 34 (Fig. 2), to thereby materially increase the area of contact between the casing and annulus.

Operation of the device described above is very simple. In the condition shown in Fig. 1, the clutch is disengaged. To engage the clutch coupling, it is merely necessary to place the space 18 under pressure by delivering oil through the duct 16 and venting the duct 15 to atmosphere. The pressure is applied to the effective area of the piston (as indicated by the diagrammatical lines toward the right of the figure) and urges said piston leftwards as shown in the drawing. The piston in its axial displacement carries the annulus 11 with it and the clutch teeth 7 and 12 are brought into engagement. To disengage the clutch, the reverse operations are effected.

It is exceedingly simple to dismantle the device when required. The method of dismantling is shown in Fig. 2. Upon the release of the screws 22, the casing 19 is displaced axially in the direction of the arrows, which renders the clutches 6 and 11 accessible. Screws 21 and the nut and bolt assemblies 23 may thereupon be released, so that the entire cylinder 26 may be removed.

The free space which is formed in this way permits the various parts of the coupling to be extracted. By removal of screw 27, the member 13 may be removed, and the removal of screws 31 enables the parts 9, 10 and 11 to be disassembled. Disengaging the nuts and bolts 4 and 5 permits the withdrawal of the annulus 6. For this complete disassembly, no displacement of the shafts 1 and 2 is required.

It will be understood that the invention is in no way limited to the specific embodiment illustrated and described, but includes all such modifications thereof as remain within the scope defined by the ensuing claims.

What I claim is:

1. A hydraulically actuated clutch for selectively connecting and releasing a first shaft and a second shaft which are independent, axially aligned and in axial spaced relationship, said clutch comprising an axially fixed coupling member having clutch teeth secured to the first shaft, an axially movable coupling member also having clutch teeth and splined to the second shaft for axial movement in relation thereto and for engaging and releasing the fixed coupling member, both said coupling members projecting into the axial space formed between the said two aligned shafts, a fluid motor comprising piston and cylinder members connected to said slidable coupling member and to said first shaft and situated axially with respect to said shafts and in the axial space formed therebetween, and separate fluid ducts leading to said fluid motor, so as to selectively engage and release the clutch, and an outer casing enclosing the entire clutch and fixed to one of the shafts.

2. A hydraulically actuated clutch for selectively connecting and releasing a first shaft and a second shaft which are independent, axially aligned and in spaced relationship, said clutch comprising an axially fixed coupling member having clutch teeth secured to the first shaft, an axially movable coupling member also having clutch teeth and splined to the second shaft for axial movement in relation thereto and for engaging and releasing the fixed coupling member, an annular piston substantially Z-shaped in section connected at one end to the movable clutch member, an annular cylinder fixed to the first shaft, a member substantially of T shape in section inside the cylinder and also fixed to the first shaft, a portion of said piston being slidable between the T-shaped member and the cylinder to form a fluid motor, with two chambers, separate fluid ducts leading to each of said chambers so as to selectively engage and release the clutch, and an outer casing enclosing the entire clutch and fixed to one of the shafts.

GUSTAV PIELSTICK.

REFERENCES CITED

The following references are of record in the file of this patent:

UNITED STATES PATENTS

| Number | Name | Date |
|---|---|---|
| 746,761 | Taylor | Dec. 15, 1903 |
| 1,978,687 | Pearmain et al. | Oct. 30, 1934 |
| 2,120,092 | Doran | June 7, 1938 |
| 2,372,151 | Whittaker | Mar. 20, 1945 |
| 2,395,459 | Carnagua | Feb. 26, 1946 |
| 2,428,336 | Munschauer | Sept. 30, 1947 |
| 2,437,430 | Lawrence | Mar. 9, 1948 |
| 2,464,975 | Gibbs et al. | Mar. 22, 1949 |
| 2,485,688 | Banker | Oct. 25, 1949 |
| 2,543,634 | Lee | Feb. 27, 1951 |

FOREIGN PATENTS

| Number | Country | Date |
|---|---|---|
| 449,077 | Great Britain | June 19, 1936 |
| 65,723 | Norway | Jan. 25, 1943 |